(12) United States Patent
Davis et al.

(10) Patent No.: US 10,678,755 B2
(45) Date of Patent: *Jun. 9, 2020

(54) FILE METADATA VERIFICATION IN A DISTRIBUTED FILE SYSTEM

(71) Applicant: International Business Machines Corporation, Armonk, NY (US)

(72) Inventors: James C. Davis, Blacksburg, VA (US); Willard A. Davis, Rosendale, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 128 days.

This patent is subject to a terminal disclaimer.

(21) Appl. No.: 15/806,399

(22) Filed: Nov. 8, 2017

(65) Prior Publication Data
US 2019/0026308 A1 Jan. 24, 2019

Related U.S. Application Data

(63) Continuation of application No. 15/652,392, filed on Jul. 18, 2017.

(51) Int. Cl.
*G06F 17/00* (2019.01)
*G06F 16/176* (2019.01)
(Continued)

(52) U.S. Cl.
CPC ...... *G06F 16/1774* (2019.01); *G06F 11/1004* (2013.01); *G06F 16/137* (2019.01);
(Continued)

(58) Field of Classification Search
None
See application file for complete search history.

(56) References Cited

U.S. PATENT DOCUMENTS 5,765,172 A * 6/1998 Fox ............... G06F 11/1608
5,893,086 A * 4/1999 Schmuck ......... G06F 11/1435
(Continued)

FOREIGN PATENT DOCUMENTS

WO 2014183084 A2 11/2014

OTHER PUBLICATIONS

James C. Davis, et al., Pending U.S. Appl. No. 15/652,392 entitled "File Metadata Verification in a Distributed File System," filed with the U.S. Patent and Trademark Office on Jul. 18, 2017.
(Continued)

*Primary Examiner* — Hasanul Mobin
(74) *Attorney, Agent, or Firm* — Cantor Colburn LLP; Teddi Maranzano

(57) ABSTRACT

Embodiments include techniques for metadata verification in a distributed file system, the technique including receiving an input for metadata, the metadata being associated with a file, and acquiring a function lock on a designated region of the file based at least in part on the metadata. The technique also includes hashing the input associated with the metadata into a designated region of the file, and updating the designated region corresponding to the input. The technique includes computing a checksum for the metadata associated with the designated region, updating a journal file based at least in part on the metadata, and releasing the function lock.

9 Claims, 6 Drawing Sheets

(51) Int. Cl.
  *H04L 29/06* (2006.01)
  *G06F 11/10* (2006.01)
  *G06F 16/13* (2019.01)
  *G06F 16/16* (2019.01)
  *G06F 16/182* (2019.01)
  *G06F 21/60* (2013.01)
  *G06F 21/64* (2013.01)

(52) U.S. Cl.
  CPC .......... *G06F 16/162* (2019.01); *G06F 16/164* (2019.01); *G06F 16/182* (2019.01); *G06F 21/604* (2013.01); *G06F 21/64* (2013.01); *H04L 63/101* (2013.01)

(56) References Cited

U.S. PATENT DOCUMENTS

| | | | | |
|---|---|---|---|---|
| 7,752,489 B2* | 7/2010 | Deenadhayalan | .. | G06F 11/1076 714/6.12 |
| 7,873,878 B2* | 1/2011 | Belluomini | ......... | G06F 11/1076 714/15 |
| 8,060,812 B2* | 11/2011 | Branda | ............... | G06F 11/1004 711/118 |
| 8,230,317 B2* | 7/2012 | Amann | ................... | G06F 3/061 714/807 |
| 8,291,101 B1* | 10/2012 | Yan | ..................... | H04L 67/1095 709/230 |
| 8,751,859 B2* | 6/2014 | Becker-Szendy | ............................ | G06F 11/1076 714/6.1 |
| 10,353,867 B1* | 7/2019 | Wong | .................. | G06F 16/1727 |
| 2002/0194209 A1* | 12/2002 | Bolosky | ................ | H04L 9/0656 |
| 2006/0098652 A1* | 5/2006 | Singh | ...................... | H04L 45/00 370/389 |
| 2008/0243898 A1* | 10/2008 | Gormish | ................. | G06F 21/64 |
| 2009/0006468 A1* | 1/2009 | Shankar | ................. | G06F 16/13 |
| 2013/0073522 A1* | 3/2013 | Chen | .................... | G06F 16/182 707/687 |
| 2013/0339313 A1 | 12/2013 | Blaine et al. | | |
| 2014/0032958 A1 | 1/2014 | Beck | | |
| 2015/0378925 A1* | 12/2015 | Misra | ................. | G06F 12/0891 711/141 |
| 2016/0292178 A1* | 10/2016 | Manville | ............. | G06F 16/1752 |
| 2018/0365281 A1* | 12/2018 | Patel | ................... | G06F 16/2365 |

OTHER PUBLICATIONS

List of IBM Patents or Patent Applictions Treated as Related; (Appendix P), Filed Nov. 8, 2017, 2 pages.

* cited by examiner

FILE METADATA VERIFICATION IN A DISTRIBUTED FILE SYSTEM

DOMESTIC PRIORITY

This application is a continuation of U.S. patent application Ser. No. 15/652,392, filed Jul. 18, 2017, the content of which is incorporated by reference herein in its entirety.

BACKGROUND

The present invention generally relates to file systems, and more specifically, to file metadata verification in a distributed file system.

Distributed files systems allow access to files from multiple hosts from different locations. Users and applications can obtain access to the shared files and storage resources of the distributed file system from one or more computer systems. There are different types of file systems where each type of file system can differ in performance, methods of storing content, etc. Because multiple clients are able to access the same data simultaneously, the distributed file system must be configured to provide a method for accessing data among the competing access requests and a technique to provide the most current version of the data being accessed. Distributed file systems generally use file replication or database replication to protect against data access failures.

SUMMARY

Embodiments of the present invention are directed to a computer-implemented method for metadata verification in a distributed file system. A non-limiting example of the computer-implemented method includes receiving an input for metadata, the metadata being associated with a file, and acquiring a function lock on a designated region of the file based at least in part on the metadata. The computer-implemented method also includes hashing the input associated with the metadata into a designated region of the file, and updating the designated region corresponding to the input. The method includes computing a checksum for the metadata associated with the designated region, updating a journal file based at least in part on the metadata, and releasing the function lock.

Embodiments of the present invention are directed to a system for metadata verification in a distributed file system. A non-limiting example of the system includes a processor being configured to receive an input for metadata, the metadata being associated with a file, and the acquisition of a function lock on a designated region of the file based at least in part on the metadata. The processor is also configured to hash the input associated with the metadata into a designated region of the file, and update the designated region corresponding to the input. The processor is configured to compute a checksum for the metadata associated with the designated region, update a journal file based at least in part on the metadata, and release the function lock.

Embodiments of the invention are directed to a computer program product for metadata verification in a distributed file system, the computer program product comprising a computer readable storage medium having program instructions embodied therewith. The program instructions are executable by a processor to cause the processor to perform a method. A non-limiting example of the method includes receiving an input for metadata, the metadata being associated with a file, and acquiring a function lock on a designated region of the file based at least in part on the metadata. The method also includes hashing the input associated with the metadata into a designated region of the file, and updating the designated region corresponding to the input. The method includes computing a checksum for the metadata associated with the designated region, updating a journal file based at least in part on the metadata, and releasing the function lock.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
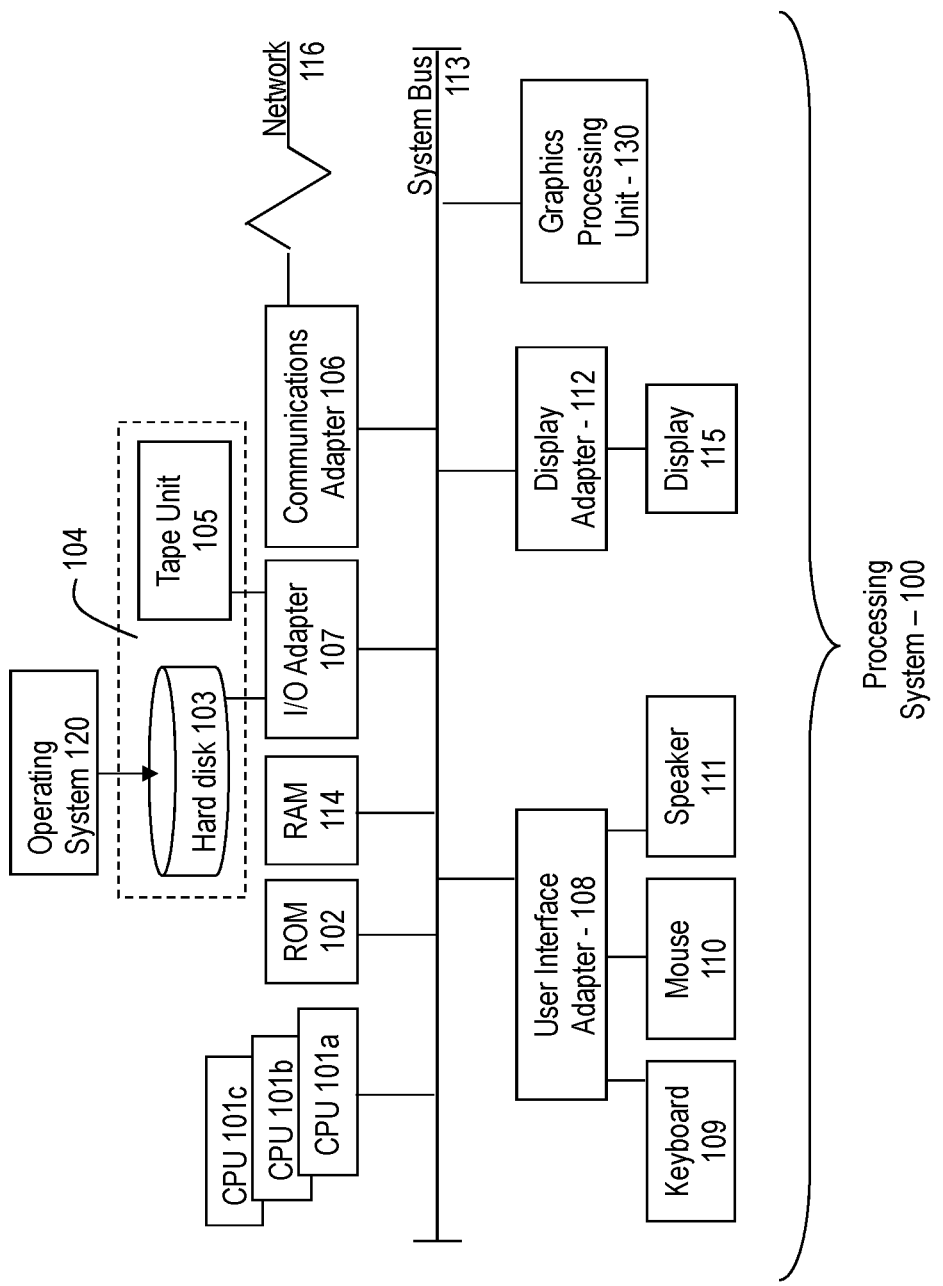
FIG. 1 is a block diagram illustrating one example of a processing system for practice of the teachings herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, metadata, locks, and journal files in the context of data file management systems will be discussed.

Metadata is a set of data that describes and provides information about other data associated with a file. Metadata includes information such as file permissions (owner/group/other), file ownership, access control lists (ACL), group file ownership, file size, file name, etc. The metadata provides for efficient location and processing of particular instances of data.

Different types of metadata exist. In one or more embodiments, a single entry metadata type is used. This type of metadata has a single field that can be modified. For example, a file can have only one name, one size, etc. at a given time. A lock can be associated with each piece of metadata when an update to the particular metadata is performed. In one or more embodiments, a multiple-entry metadata type is used. This type of metadata can have multiple entries. This type of metadata can have multiple entries where a first set of bytes is associated with a first attribute, a second set of bytes associated with a second attribute, etc. For example, the multiple-entry metadata includes the set of EAs [xattrs, extended attributes, name-value pairs] on the file.

Access to the metadata is controlled by the acquisition of a FCNTL (function control) lock (read or write lock) on the associated region of the file. The designated region within a file represents each piece of metadata. In order to update the metadata, the FCNTL lock must be acquired over the corresponding region of the file which limits access by other users and/or applications.

A non-limiting example of multiple-entry metadata is a file's Extended Attributes (EA). A file can have a set of EAs having no practical constraint on the number of EAs. Extended attributes are user-defined metadata consisting of a set of keys and corresponding values. The set of key-value pairs, known collectively as extended attributes, can be queried to search for files fitting particular descriptions. A file can have many EAs applied to it, and the number of EA's a file can have is file system implementation dependent, but it can be a number in the tens of thousands.

In one or more embodiments, the metadata is stored in an inode, where an inode is a data structure that describes a filesystem object such as a file or a directory. Each inode stores the attributes and disk block locations of the objects data.

In portable operating system interface-compliant (POSIX) file systems, FCNTL locks are the mechanism by which processes may request advisory locks on particular byte ranges of a file. However, the locks do not extend to file metadata, where the metadata is data that is associated with a file that is not stored within the file itself but is rather tracked elsewhere in the file system. Because FCNTL locks do not apply to metadata, there is no POSIX mechanism for providing fine-grained locks on file metadata.

Currently, locks can only be applied to the data portion of a file, and not the file metadata portion of the file. For example, when there are competing requests to access data, the file system must determine which application or user is to gain access to the metadata and perform an update.

Applications can principle associate regions of the file with metadata fields, where FCNTL locks on these regions are used to control access to the metadata. In an embodiment, the locks can be stored at the end of the file after the data. In one or more embodiments, the data can be stored in a work file while the locks are stored in a separate lock file. In a different embodiment, it may be stored at the end of the file. In order to update metadata, locks must be taken for the file corresponding to the metadata. For example, to update an ACL, the portion of the file associated with ACL is known. The lock can be taken on that portion and the ACL updated without conflict.

A journal file contains a data structure that is configured to track changes to data of a file. In one or more instantiations, the journal file can store error checking information and recent updates associated with the file.

In theory, the metadata lock does not conflict with the lock on the data. In one or more embodiments, the file system is the General Parallel File System (GPFS) and does not have a locking mechanism for the metadata. However different extended attributes can be modified at the same time. For example, user 1 can modify attribute 1 as user 2 simultaneously modifies attribute 2.

In an implementation, a generic user can take one or more locks to update the metadata such as an extended attribute (EA). EAs are individual pieces of metadata that can be modified independently of other EAs. In other words, the set of EAs is divisible. The described technique uses metadata locks to lock the individual EAs by providing a fine-grained locking mechanism for the file metadata. This mechanism allows other applications or users to simultaneously access other metadata that have not been locked.

Because the metadata includes information relating to permissions, owners, the name of the document, last time it was modified, size, etc. a failure to properly update and/or verify the information can be undesirable. For example, if the metadata associated with file permissions is incorrect, unwanted access may be provided to unauthorized applications and users. In addition, if the metadata associated with the file size is not properly updated, a scenario can arise where data is eliminated from the file or alternatively, spurious data may be added to the file based on the error. The failure to verify the metadata can cause corruption in the file if the errors are not discovered. The tool described herein is developed to capture these errors and other metadata integrity errors during a test.

The techniques described herein provide a fine-grained mechanism to obtain access to such file metadata which can be controlled by FCNTL locks. In addition, these techniques enable concurrent access to file metadata while maintaining the verifiability of the integrity of the metadata being accessed. Enabling the verifiability of the metadata is critical to verifying the integrity of the file system.

Turning now to an overview of the aspects of the invention, one or more embodiments of the invention address the above-described shortcomings of the prior art by providing a mechanism to verify metadata while allowing for concurrent access to the metadata during an update.

The techniques described herein enable concurrent access to file metadata while providing a mechanism to verify the integrity of the metadata being accessed. A designated region portion of a file is divided into to a plurality of sub-regions which are used to manage locks on each piece of metadata. In the event EAs are used, hash buckets can be used to divide the region. In the event single data metadata is used, other regions can be dedicated to the single-entry metadata. This configuration does not automatically restrict access to all metadata and allows other metadata associated with a different sub-region to be concurrently accessed. In addition, a verification scheme is provided where a checksum is used. In one embodiment, a running checksum is used for EA verification for all EAs belonging to a particular sub-region. In a different embodiment, a single checksum can be used for different types of metadata (file size, access permissions, etc.). This enables the system to verify the metadata and to further verify the correct functioning of the file system.

Each piece of metadata is hashed and mapped to a sub-region according to the metadata name, which allows unrelated pieces of metadata to be represented in a single sub-region. This feature allows for redundancy in error checking the file system and can provide debugging information. For each piece of file metadata information, a large amount of information is available in the journal file related to the expected contents. In the event of EA corruption, the chain of EAs, formed by the linked list configuration of the EAs associated with a hash bucket, will be broken, and it will be clear that the corruption has occurred based on the information in the journal file. Embodiments also include techniques for the verification of metadata including extended attributes.

The techniques described herein provide for concurrent access to the metadata and increases the reliability of the data by performing metadata verification at increased intervals. The implementation of the plurality of hash buckets allows for the concurrent access and metadata verification at increased intervals because locks are placed on the hash bucket and not on each and every piece of the metadata stored in the hash table. The above-described aspects of the invention address the shortcomings of the prior art by enabling the independent access to the metadata and verifying the metadata of the file system.

Turning now to a more detailed description of aspects of the present invention, FIG. 1 depicts an embodiment of a processing system 100 for implementing the teachings herein. In this embodiment, the system 100 has one or more central processing units (processors) 101*a*, 101*b*, 101*c*, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2B:
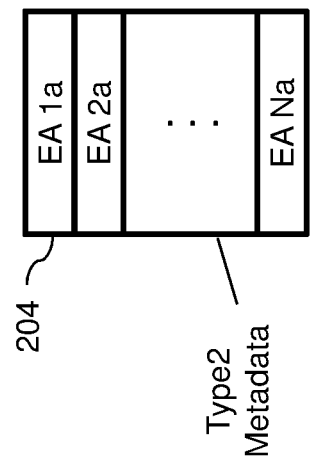
FIGS. 2a and 2b depict a metadata used in a metadata verification in a distributed file system in accordance with one or more embodiments.
Figure 2A:
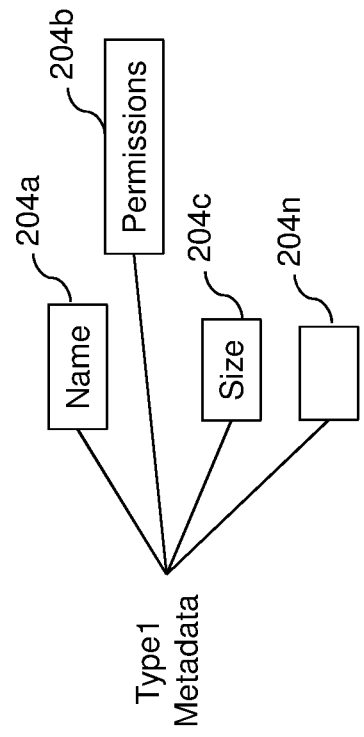

Now referring to FIG. 2a, a metadata type 200a for use in metadata verification in a distributed file system in accordance with one or more embodiments is provided. For a type 1 metadata, a single lock is required for each piece of single-entry metadata 204. In one or more embodiments, each individual piece of metadata 204 can be associated with different information associated with a file such as a file name 204a, file permissions 204b, file size 204c, etc. 204n. Other information that can be stored as metadata is considered to be within the scope of individual pieces of metadata. In this non-limiting example, an individual lock will have to be acquired for each piece of metadata 204.

Now referring to FIG. 2b, a metadata type 200b for use in metadata verification in a distributed file system in accordance with one or more embodiments is provided. For a type 2 metadata, a set of locks can be associated with a set of metadata. In one or more embodiments, the metadata 206 can include extended attributes EA 1a, EA 2a . . . EA Na (also shown in FIG. 4).

Figure 3:
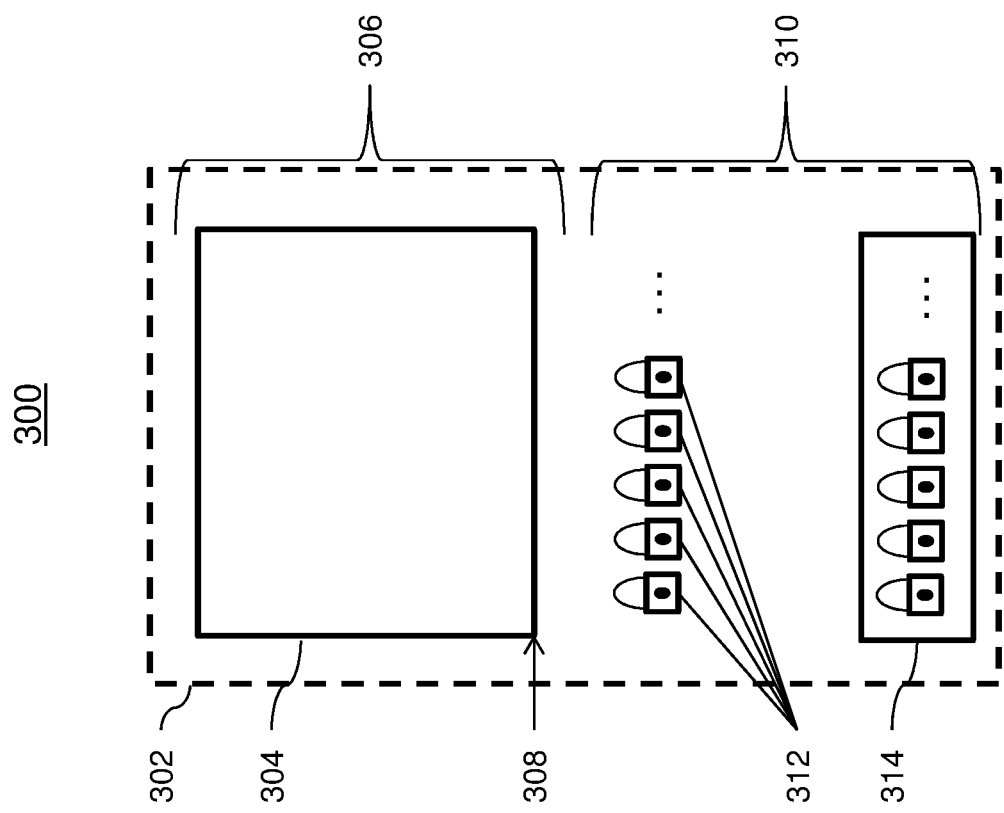
FIG. 3 depicts a system for metadata verification in a distributed file system in accordance with one or more embodiments.

Now referring to FIG. 3, a file 300 for metadata verification in a distributed file system in accordance with an embodiment is provided. A file 302 having a portion 304 storing data is shown in FIG. 3. The file data 304 is shown as taking up an addressable space portion 306 of the file 302. The files maximum size 308 is shown as a portion of the used address space portion 306.

In one or more embodiments, a portion of the file that is unused (not currently storing file data) but has addressable space 310 can be used for the obtaining locks 312, 314. In an embodiment, locks 312 can be for type 1 metadata where each individual piece of metadata requires an individual lock. In one or more embodiments, the locks 314 for the type 2 metadata can be used for extended attributes. In this example, a limited set of locks 314 is provided for the type 2 metadata. In one or more embodiments, hash buckets can be used to divide the region 310 dedicated to the type 2 metadata locks 314 (EA locks), where the remaining space in the region can be dedicated to the single-entry type metadata 312.

In one or more embodiments, the metadata locks 312, 314 can reside in separate file, within (not beyond the end of the current used data portion 308 of the file) a file, and/or can be acquired using one or more lock managers. In a different embodiment, a lock manager can manage all of the locks, including the locks for type 1 and type 2 metadata. It is also considered to be within the scope to acquire and store the metadata locks in any location in the distributed file system.

Figure 4:
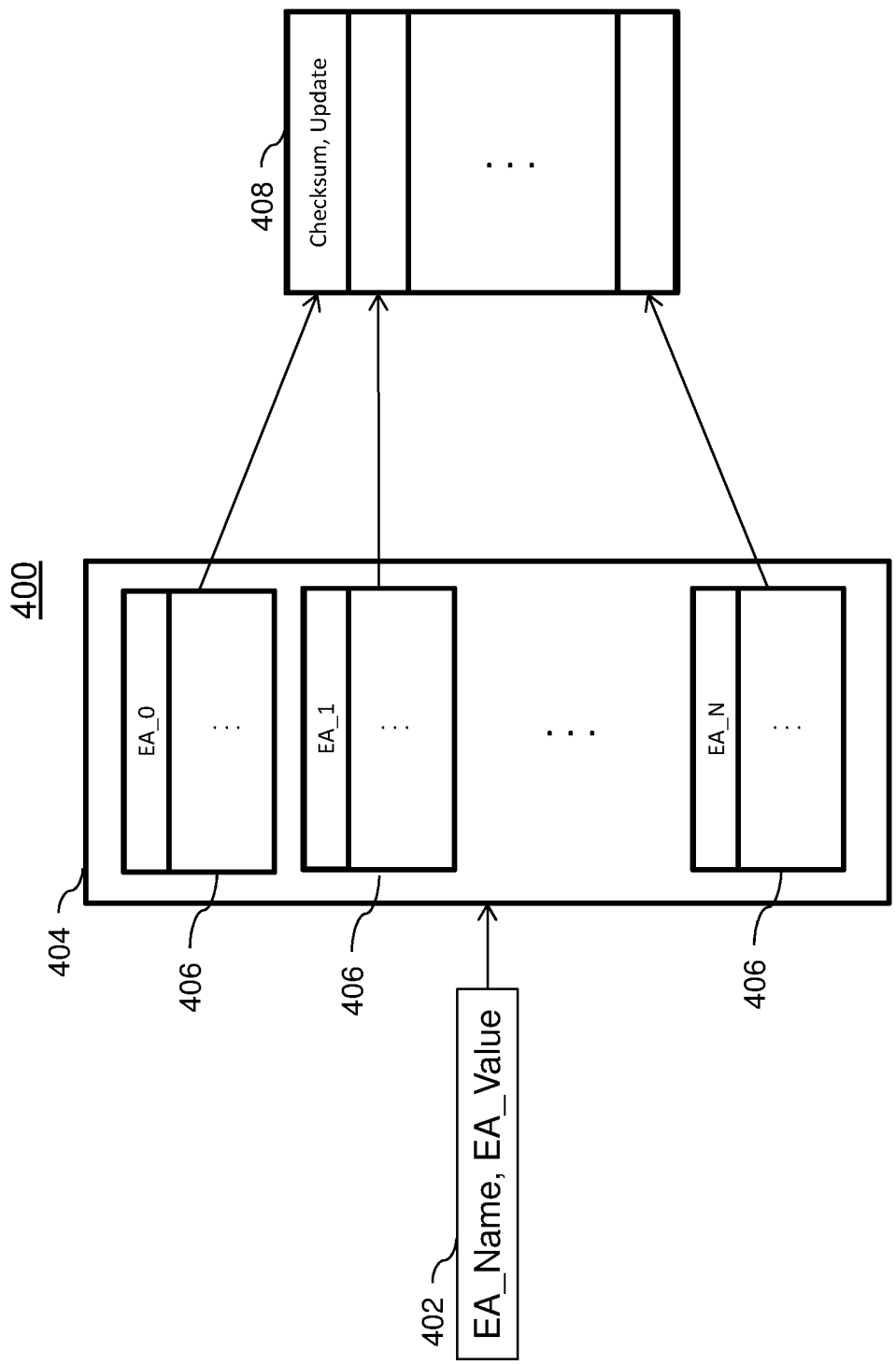
FIG. 4 depicts another system for metadata verification in a distributed file system in accordance with one or more embodiments.

Now referring to FIG. 4, a system 400 for metadata verification in a distributed file system in accordance with an embodiment is provided. System 400 receives an input 402 to process metadata. In a read path example for single entry metadata, the metadata can be a filename. A FCNTL read lock can be taken on the associated region of the file corresponding to the filename. In this example, the metadata filename will be read. Next, the checksum for the metadata will be calculated and compared to the most recent record in the journal file.

In a write path example for single entry metadata, a FCNTL write lock can be taken on the corresponding region of the file for the filename. Next, the filename will be written into the value for the metadata filename. The checksum for the filename will be calculated and written to the record in the journal file.

In another non-limiting example, the metadata to be processed is an extended attribute (EA). In one or more embodiments, the input 402 can include an EA_NAME and an EA_EXPECTE_VALUE. In some embodiments, only the EA_NAME is included in the input 402. The input 402 can be a request to modify an existing EA, add a new EA, delete an EA, verifying an existing EA, read an existing EA, etc.

The system 400 includes a designated region structured in an embodiment as a hash table 404. In one or more embodiments, the hash table 404 includes one or more elements, where each element includes a key-value pair. The key represents a unique identifier for an item of data and the value is either the data that is identified or a pointer to the location of that data. In a non-limiting example, the key is the EA_NAME and the value is the EA_VALUE. In addition, each element can store a Previous Pointer to locate an element that is before the current element and a Next Pointer to locate a next element that is after the current element. The Previous Pointer and Next Pointer are used to form a chain or a linked list of elements where an order of the elements can be realized.

The structure can be a doubly linked list on the EAs that are part of each hash bucket. Each EA will embed the name of the EA before and after it in this list as part of its value. Each set of all EAs hashed into a particular bucket must have a unique and identifiable first element so the start of the list can be identified in the hash table. One non-limiting example can include using EA names of the form myEA0, myEA1, myEA2, myEA3, while using the modulus operator on the number embedded in the EA name as hash function. In this example, the modulus number with the lowest number that is hashed into a given bucket is identified as the first element for the given hash bucket.

The hash table 404 can be divided into a plurality of sub-regions. When EAs are used, the sub-regions can be referred to as hash buckets 406. In one or more embodiments, the system 400 can divide the hash table 404 into equally sized hash buckets 406. Although the hash buckets are illustrated as sequential portions of the hash table, the hash buckets 406 are used as an organizing principle and do not manifest itself in terms of the reads and writes to the file metadata.

After a lock has been secured, the EA_NAME 402 is hashed into one of a plurality of hash buckets 406 to determine where to begin an operation according to the input EA_NAME 402.

As shown in FIG. 4, in accordance with an embodiment, each hash bucket 406 is configured with a first element name to identify the start of each hash bucket 406 in the hash table 404. Each EA_Name 402 is hashed into one of a plurality of hash buckets in a balanced manner. For example, the hash function is selected to evenly distribute the EAs into one of the plurality of hash buckets 406. It is considered to be within the scope to select any other known type of hashing functions or techniques.

In one or more embodiments, the locks associated with the hash table 404 can be located at the end of a file. The FCNTL locks can be taken after the end of the file. In a different embodiment, FCNTL locks can be placed in the existing part of the file. In one or more embodiments, the hash table is encoded into the values of the EAs, which form linked lists beginning with EA_1, EA_1, etc. In these embodiments, the hash table does not need to be stored in the file of the journal file 408. In different embodiments, the hash table 404 can be stored.

System 400 also includes a journal file 408 for tracking the updates to the metadata. The journal file 408 includes a plurality of records associated with the metadata and EAs that have been updated. In one or more embodiments, the journal file 408 tracks the updates for each of the hash buckets 406. A record or entry in the journal file 408 can store a checksum for each hash bucket 406 (i.e. a cumulative checksum over every EA in the bucket, and the corresponding updated for the particular metadata. The checksum is used to link each record in the hash bucket 406 in the error checking process. Therefore, an update to a single element in the hash table 404 will update the checksum for the hash bucket 406 associated with the EA.

The journal file 408 maintains a record for each respective hash bucket 406. In other embodiments, other configurations of the hash table 404 and the journal file 408 are envisioned. The journal file 208 is configured to store a checksum for each hash bucket 406. After updating an EA, the technique includes reading all of the EAs in a given hash bucket and generating a checksum based on EA. The generated checksum is compared to the checksum stored in the journal file 408 to verify the EA and the elements of the hash bucket 406. Because the elements of each hash bucket 406 are linked to other elements in the hash bucket when performing the verification where the computed checksum for the hash bucket 406 does not match the corresponding checksum stored in a record of the journal file 408, an error indicating a break in the chain of elements is returned.

This solution includes verifying, updating, deleting, or adding an EA. This is similar to but not identical to the related linked list operations, however, the current solution requires that each element of the list be unique, and must also contain a uniquely identifiable first element.

Figure 5:
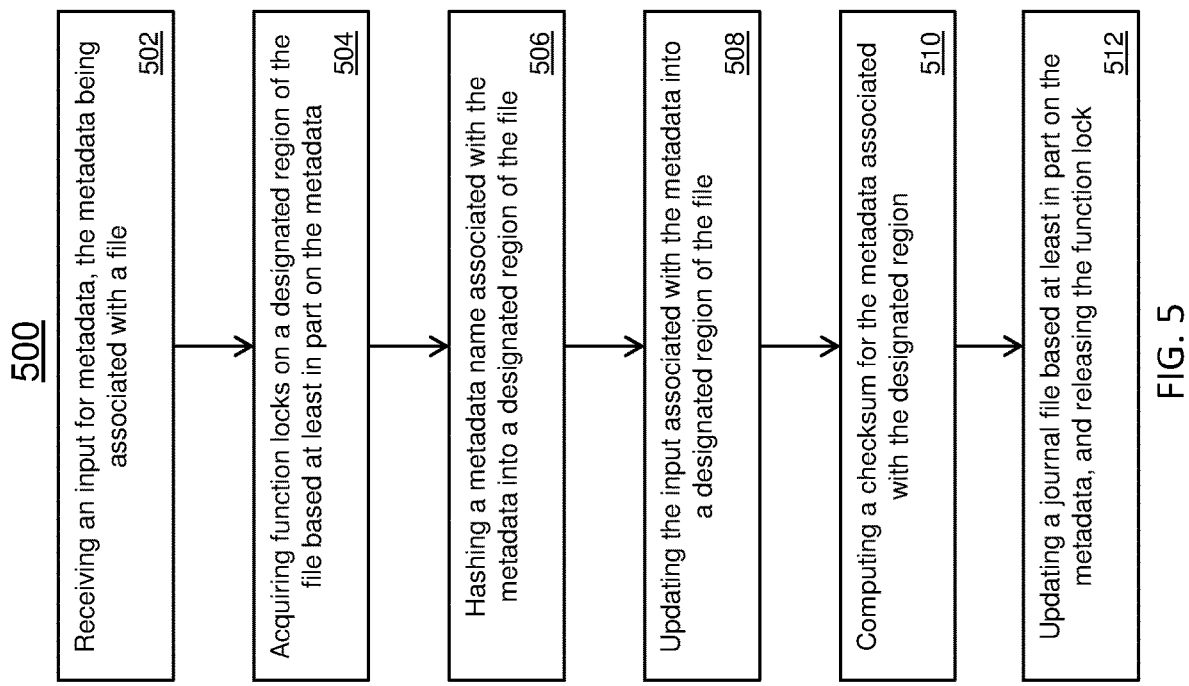
FIG. 5 depicts another system for metadata verification in a distributed file system in accordance with one or more embodiments.

Now referring now to FIG. 5 a method 500 for metadata verification in a distributed file system is provided. Block 502 provides receiving an input for metadata, the metadata being associated with a file. In one or more embodiments, the input can include a <name/key> pair. In one or more embodiments, the input can include a request for updating, reading, writing, deleting, verifying, etc. the metadata. In an embodiment, the metadata can be a single entry type or a multiple-entry type metadata. The multiple-entry type metadata includes extended attributes which can be accessed concurrently and independently of other extended attributes.

Block 504 provides acquiring function locks on a designated region of the file based at least in part on the metadata. The function locks can include read and write locks. The designated region within a file represents each piece of the metadata. In one or more embodiments, the designated region is a hash table. The designated regions refer to the file which the metadata belongs or another lock file. Therefore, when a lock is taken on these regions, a lock on a given regions is interpreted as a lock on a given piece of metadata. In one or more embodiments, the designated region can occur at the end of the file associated with the metadata. In a different embodiment, the designated region can be a file separate from the data of the file.

Block 506 provides hashing a metadata name associated with the metadata into a designated region of the file. In one or more embodiments, the metadata names are encoded with information used during hashing. Various hash functions can be used. In one or more embodiments, the designated region can be divided into a plurality of sub-regions (hash buckets).

Block 508 provides updating a journal file based at least in part on the metadata. The journal file is configured to store a plurality of records where each record can hold information including a checksum, metadata name associated with the most recent change. Each journal file record is also configured to store the checksum, the name and value of the updated EA, the time, the process identifier (PID), etc.

Block 510 provides computing a checksum for the metadata associated with the designated region. In one or more embodiments, the designated region is equally divided into a number of hash buckets and the checksum is computed from each element in the hash buckets.

Block 512 provides updating a journal file based at least in part on the metadata and releasing the function lock. In one or more embodiments, the corresponding record is updated in the journal.

Figure 6:
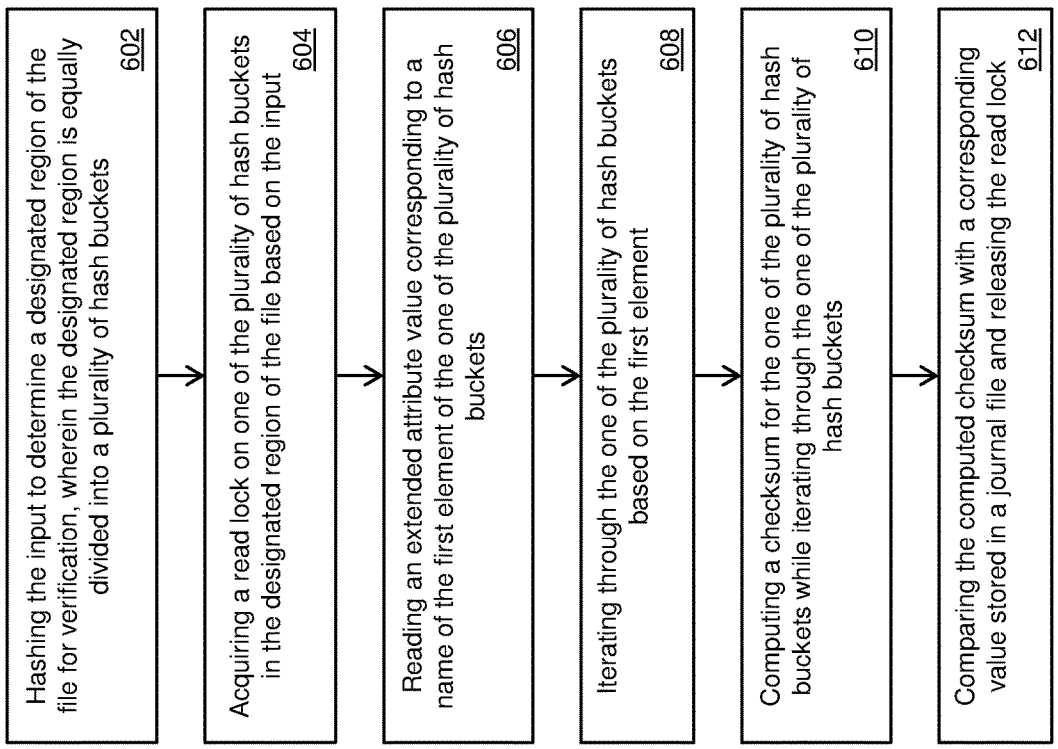
FIG. 6 depicts another system for metadata verification in a distributed file system in accordance with one or more embodiments.

Now referring to FIG. 6, a method 600 for metadata verification of a distributed file system in accordance with an embodiment is provided. Block 602 includes hashing the input to determine a designated region of the file for verification, wherein the designated region is equally divided into a plurality of hash buckets.

Block 604 includes acquiring a read lock on one of the plurality of hash buckets in the designated region of the file based on the input. Block 606 includes reading an extended attribute value corresponding to a name of the first element of the one of the plurality of hash buckets.

Block 608 includes iterating through the one of the plurality of hash buckets based on the first element. Block 610 includes computing a checksum for the one of the plurality of hash buckets while iterating through the one of the plurality of hash buckets. In one or more embodiments, the checksum for each EA in the hash bucket is computed.

Block 612 includes comparing the computed checksum with a corresponding value stored in a journal file and releasing the read lock. If the computed checksum and the stored checksum value in a record in the journal file does not match, then an error is returned. Otherwise, an error is not detected for the EA and the EAs of the hash bucket.

Process for accessing the metadata includes modifying, adding, deleting, reading, verifying the metadata. Details of the different processes are shown below.

Modifying/Adding Path

When modifying an existing EA or adding a new EA to the file, the EA_Name associated with the input is hashed to determine a hash bucket for entry. Next a write lock is acquired on the appropriate region of the file associated with the hash bucket.

Subsequently, the EA_Value corresponding to the name of the First Element of the hash bucket read. If the particular EA does not exist, it can be added to the file and the Previous and Next pointers in the EA_Value can be set to NULL. This value is then read.

The computation of the checksum beings with the <key-value> pair of the First Element and adding the <key, value> pair of each successive element in the chain.

The Next EA is read from the EA_Value of the First Element, is read and the process is repeated until an Element with an EA_Value indicating the EA_Name of the input or with a NULL as the Next Value is reached. Each time an EA is found, the checksum is updated to keep a running total value for each EA. In one or more embodiments, the running total is maintained for the EAs that are linked together in a hash bucket.

In the event an EA with EA_Name is found, the EA_Value is updated to the EA_Value of the input. In the event the EA_Name is not found and an EA with a NULL Next value, the Next Value is updated to the EA_Name of the input and the EA_Value will be set in the be the value of the input. The Previous value of the new EA is set to the last EA, and the Next value of the new EA is set to NULL.

The EAs are continuously read until an EA with a NULL Next Value is reached, updating the checksum of the list as the list is crawled. After the end of the list is located and the checksum is calculated, the name and value of the updated EA, the time, the PID, etc. is written to a journal file. Then the region of the file is unlocked.

Delete Path

When deleting an EA from the file, the EA_Name associated with the input is hashed to determine the hash bucket to perform the search. Next a write lock is acquired on the appropriate region of the file associated with the hash bucket.

Subsequently, the EA_Value corresponding to the name of the First Element of the hash bucket read. If there is not First Element in the hash bucket, the EA with name EA_Name does not exist and the region of the file is unlocked. In the event the First Element exists, the computation of the checksum begins.

The Next EA is read from the EA_Value of the First Element, is read and the process is repeated until an Element with an EA_Value indicating the EA_Name of the input or with a NULL as the Next Value is reached. Each time an EA is found, the checksum is updated to keep a running total value for each EA. In one or more embodiments, the running total is maintained for the EAs that are linked together in a hash bucket.

If the EA with EA_Name is determined the EAs that come before and after are determined. The EA with the EA_Name is deleted and the Next and Previous values are updated with the determined EAs.

The EAs are continuously read until an EA with a NULL Next Value is reached, updating the checksum of the list as the list is crawled. After the end of the list is located and the checksum is calculated, the name and value of the updated EA, the time, the PID, etc. is written to a journal file. Then the region of the file is unlocked.

Read Path

When reading an EA from a file, the EA_Name associated with the input is hashed to determine a hash bucket for entry. Next, a read lock is acquired on the appropriate region of the file associated with the hash bucket.

Subsequently, the EA_Value corresponding to the name of the First Element of the hash bucket read. If there is no First Element in the hash bucket, the EA with name EA_Name does not exist and the region of the file is unlocked and an error is returned. In the event the First Element exists, the computation of the checksum begins.

The Next EA is read from the EA_Value of the First Element, is read and the process is repeated until an Element with an EA_Value indicating the EA_Name of the input or with a NULL as the Next Value is reached. Each time an EA is found, the checksum is updated to keep a running total value for each EA.

In the event an Expected Value was provided, when the EA with EA_Name is found, its value is read and compared. If they do not match then an error is returned.

The EAs are continuously read until an EA with a NULL Next Value is reached, updating the checksum of the list as the list is crawled. After the end of the list is located and the checksum is calculated, the name and value of the updated EA, the time, the PID, etc. is written to a journal file. Then the region of the file is unlocked Verifying Path For each hash bucket, a read lock is acquired on the appropriate region of the file. Read the EA value corresponding to the name of the first element of the hash bucket. Next, the list of EAs is traversed, calculating the checksum for the list of EAs in the hash bucket.

The checksum is calculated from the EAs and compared to the checksum stored in the journal file for the hash bucket. Subsequently, the appropriate region of the file is unlocked.

In one or more embodiments, the metadata and/or EAs that are associated with the different hash buckets can be concurrently accessed due to the fine-grained locking mechanism that is described. For example, a first user can access a first EA associated with a first hash bucket simultaneously as a second user accesses a second EA associated with a second hash bucket, although the first and second EA are associated with the same file. The first EA can be associated with a file name and the second EA can be associated with a file length. Because the two EA are controlled by two separate locks and are located in two different hash buckets of the designated region for locks, the metadata can be simultaneously accessed.

As can be realized by the previous examples, a larger number of regions (hash buckets) will increase the level of concurrency allowing more simultaneously accessing to occur to the metadata in the different hash buckets.

In one or more embodiments, EAs can be randomly selected to be added or deleted as opposed to specifying EAs among the conventional techniques. The calculation of the running checksum for each hash buckets allows for an efficient verification.

In addition, each pointer of the EA can be verified as the list is iterated during each access of an element belonging to the hash bucket. If the pointers are not in alignment then corruption exists in the file and an error should be returned. For example, if an EA has a Next pointer and there is no EA with the name indicated, then corruption exists.

In one or more embodiments, when there is no ordering of a set of EA names, a "master" EA can be set prior to the configuration of any other EAs. The master EA contains the starting EA for each hash bucket, and allows the first element in a given hash bucket to be arbitrary, meaning the EA do not have to follow a particular naming scheme such as myEA0. The master EA has a unique part of the EA region set aside for FCNTL locks to allow read/write locks. The use of a master EA the system provides flexibility in terms of names used for the EAs.

The described techniques allow for concurrency in metadata updates while allowing metadata verification of the data. The prior art does not allow for concurrent access when a lock is obtained on data and does not provide a locking mechanism for metadata. The metadata extends to extended attributes which can be updated independently and is allowed concurrent reading and updating. A fine-grained approach to implementing locks on the metadata is described. The described techniques allow for the locking of metadata (extended attributes) without locking all of the other metadata from access.

Also, because in each operation the contents (elements) of the entire hash bucket (linked list, chain of EAs) are iterated through to determine a total checksum, an error or corruption among the metadata (EA) can be detected fairly rapidly. This is possible because each EA in a hash bucket is linked together and a checksum is calculated for the EAs that are grouped in each hash bucket. This is in contrast to the per-EA scheme where a problem would not be detected unless a particular EA was individually selected and verified. Another improvement includes the verification of unrelated EAs which are linked together in a given hash bucket. The EAs associated with different applications/files can be stored and verified in the same hash bucket providing redundancy in checking the operability of the file system.

The techniques described herein increase the reliability of data files as the metadata associated with those data files can be verified. Corruption and defects among the metadata can now be discovered. The metadata verification has the ability to test unrelated attributes are not corrupted with a single verification operation of all elements in a hash bucket. In addition, the system does not artificially lock access to other metadata and allows for concurrent access to the metadata allowing for efficient updates to different metadata corresponding to a file.

The techniques described herein also increase the efficiency in which data and associated metadata are stored. For example, the journal file includes entries associated with a group of metadata elements (hash buckets) and not necessarily each individual entry resulting in a reduction in overhead while maintaining or increasing the reliability of the data.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for metadata verification in a distributed file system, the computer-implemented method comprising:

receiving an input for metadata, the metadata being associated with a file;

acquiring a function lock on a designated region of the file based at least in part on the metadata;

hashing the input associated with the metadata into a designated region of the file;

updating the designated region corresponding to the input;

computing a checksum for the metadata associated with the designated region;

updating a journal file based at least in part on the metadata;

releasing the function lock; and verifying the metadata, the verification comprises:

hashing the input to determine a designated region of the file for verification, wherein the designated region is equally divided into a plurality of hash buckets;

acquiring a read lock on one of the plurality of hash buckets in the designated region of the file based on the input;

reading an extended attribute value corresponding to a name of a first element of the one of the plurality of hash buckets;

iterating through the one of the plurality of hash buckets based on the first element;

computing a checksum for the one of the plurality of hash buckets while iterating through the one of the plurality of hash buckets; and comparing the computed checksum with a corresponding value stored in a journal file; and releasing the read lock.

2. The computer-implemented method of claim 1, further comprises equally dividing the designated region of the file into a plurality of hash buckets.

3. The computer-implemented method of claim 1, concurrently accessing metadata associated with hash buckets of the plurality of hash buckets.

4. The computer-implemented method of claim 1, wherein a hash function for the hashing distributes metadata names among a plurality of hash buckets.

5. The computer-implemented method of claim 1, wherein a checksum is calculated and stored for at least one of each hash bucket of the plurality of hash buckets or each piece of metadata.

6. The computer-implemented method of claim 1, wherein the updating the designated regions includes one or more of modifying, adding, deleting, reading, or writing metadata.

7. The computer-implemented method of claim 1, wherein at least one of each hash bucket is configured with a unique and identifiable first element prior to the hashing the metadata or a master extended attribute is configured for the designated region.

8. The computer-implemented method of claim 1, wherein a record of the journal file is designated for each hash bucket and tracks most recent updates on a per-hash bucket basis, wherein each hash bucket is capable of storing metadata for unrelated files.

9. The computer-implemented method of claim 1, wherein the designated region is located after at an end of the file.

* * * * *